Aug. 25, 1970  V. A. MUTKA  3,525,548
MOUNTING FOR THE FENDER DECK OF A TRACTOR
Filed June 24, 1968  2 Sheets-Sheet 1
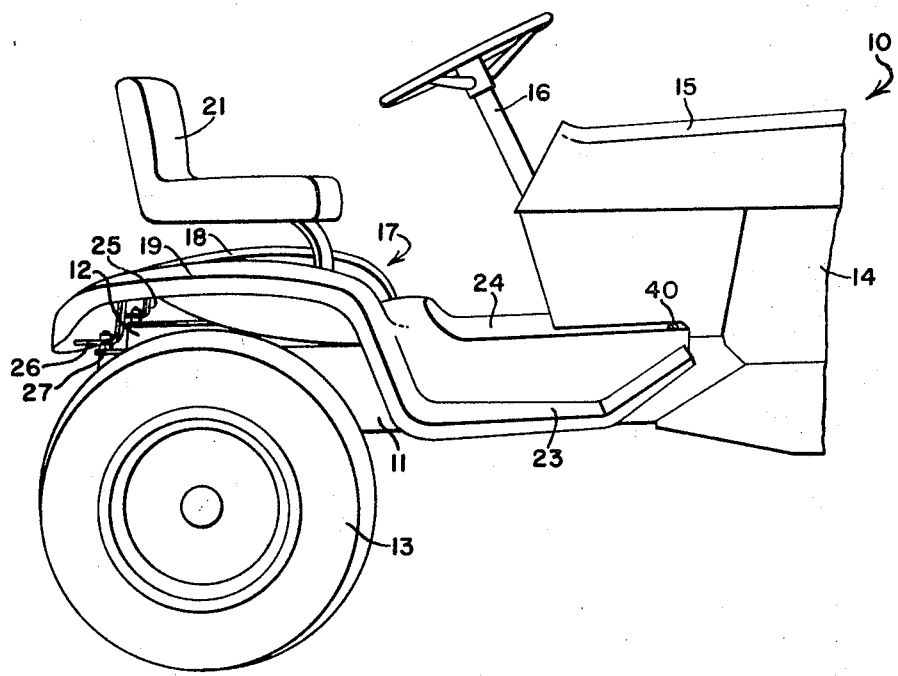
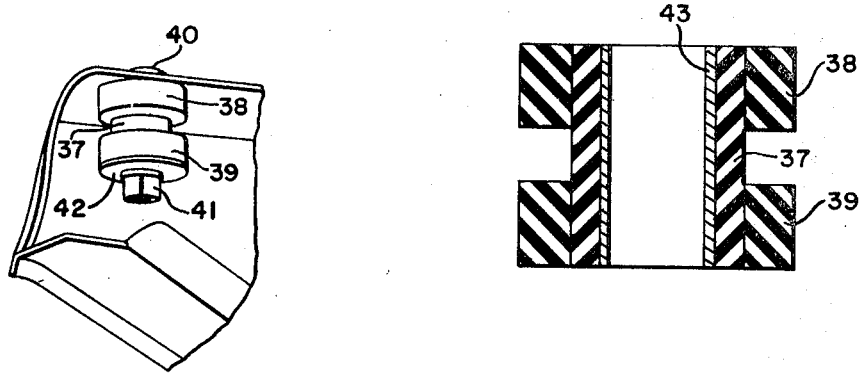
*INVENTOR.*
VILHO A. MUTKA
BY
R L Hollister
AGENT

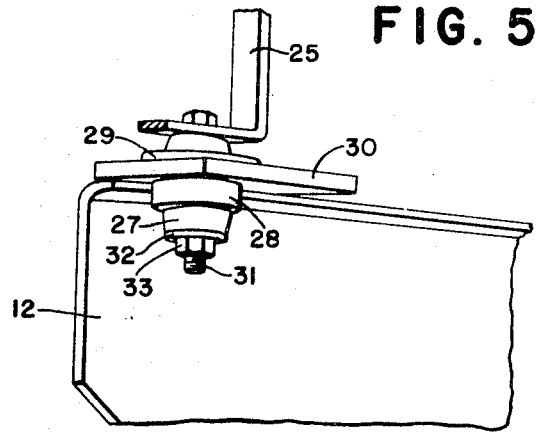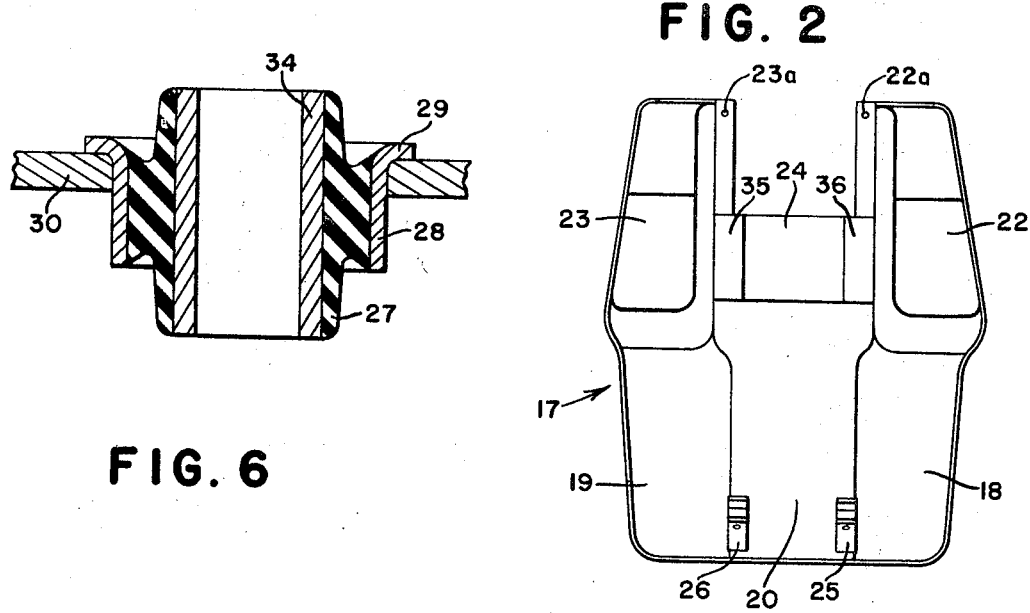

United States Patent Office 3,525,548
Patented Aug. 25, 1970

---

3,525,548
MOUNTING FOR THE FENDER DECK OF A TRACTOR
Vilho A. Mutka, Horicon, Wis., assignor to Deere & Company, Moline, Ill., a corporation of Delaware
Filed June 24, 1968, Ser. No. 739,483
Int. Cl. B62d 25/22
U.S. Cl. 296—35
5 Claims

ABSTRACT OF THE DISCLOSURE

The fender deck of a lawn and garden tractor is mounted on the tractor frame through resilient mounts which prevent a major portion of the vibrations set up by the tractor engine from being passed on to the fender deck and the operator.

BACKGROUND OF THE INVENTION

The present invention relates generally to the mounting of a fender deck on a tractor frame, and more particularly to such a mounting which will isolate a portion of the vibrations set up in the tractor frame by the tractor engine from the fender deck and the tractor operator.

It has become common practice to provide lawn and garden tractors with an operator's platform which includes integral fenders and footrests. Such a platform, commonly called a fender deck, is generally mounted directly on the tractor main frame and the operator's seat is mounted on the platform. By making the fenders, seat-mounting platform, and footrests of a single-piece construction, the aesthetic value of the tractor is increased and manufacturing costs kept at a minimum. However, since the fender deck is mounted directly on the tractor frame, an intolerable portion of the vibrations set up in the frame by the tractor engine are passed on to the operator. These vibrations present a particular problem in the footrests. It takes very little time before the vibrations in the footrests begin to excite the nerves of the operator's feet and cause an uncomfortable tickling sensation, and if the operation of the tractor is sustained over a long period of time, the operator's feet become numb.

Since the main frame of a lawn and garden tractor is relatively light, very little can be done to prevent the vibrations of the engine from setting up vibrations in the frame. This is particularly true when the tractor is provided with a belt drive because the engine must be mounted directly on the frame in order to maintain the belt sheaves in alignment. Therefore, it becomes necessary to prevent the vibrations present in the tractor frame from being passed on to the fender deck.

SUMMARY OF THE INVENTION

An object of the present invention is to provide a novel and improved means of mounting a fender deck on a tractor frame.

Another object of the invention is to provide a shock or vibration mounting for the fender deck of a lawn and garden tractor which will isolate the operator from engine vibrations.

The above objects are accomplished by providing six resilient mounts for the fender deck. The mounts are so positioned that the weight of the operator is normally carried by four of the mounts. Two of the normal weight-carrying mounts are positioned at the rear of the fender deck behind the seat-mounting platform, while the other two are positioned rearwardly of the forward end of the footrests but in front of the seat-mounting platform. The two remaining resilient mounts are positioned at the forward end of the footrests and normally function to keep the footrests in proper position with respect to the tractor frame and prevent the footrests from engaging the tractor frame when the weight of the operator is placed on the footrests, for example, when mounting or dismounting. With the resilient mounts positioned as indicated, the weight of the operator will resist movement of the fender deck and the four resilient mounts which normally carry the weight of the operator will yield to absorb the vibrations. Since the remaining two mounts do not hold the footrests tightly to the frame, but allow for slight relative movement, the vibrations are not passed from the frame to the footrest. The relative movement between the footrests and the frame is essential since the footrests normally do not carry sufficient weight to resist movement and therefore the two forward resilient mounts would not yield sufficiently to absorb the vibrations.

The above objects and the details of construction of the present invention will become apparent from a reading of the following detailed description taken in conjunction with the accompanying drawings.

BRIEF DESCRIPTION OF THE DRAWINGS

In the drawings:
FIG. 1 is an elevational view of the rear end portion of a tractor illustrating a fender deck in the position it assumes on the tractor frame;
FIG. 2 is a bottom plan view of the fender deck illustrated in FIG. 1;
FIG. 3 is a perspective view of the forward portion of one of the footrests of the fender deck illustrating one of the forwardmost mounts;
FIG. 4 is a sectional view of the mount illustrated in FIG. 3;
FIG. 5 is a perspective view of a rear end portion of the tractor frame illustrating one of the rearmost mounts; and
FIG. 6 is a sectional view of the mount illustrated in FIG. 5.

DESCRIPTION OF THE PREFERRED EMBODIMENT

Referring now to the drawings, and particularly to FIGS. 1 and 2, a tractor is indicated generally at 10 and includes spaced main frame members 11 and 12 carried by wheels 13, a forward engine compartment 14, a hood 15, and steering mechanism 16. Each of the main frame members is constructed from an L-shaped beam which is inverted to provide a large vertically extending leg and a short horizontally extending leg. A fender deck, indicated generally at 17, is mounted on the frame members 11 and 12. The fender deck is of one-piece construction and includes laterally spaced fenders 18 and 19 which are positioned over the rear wheels 13, a mounting surface 20 for the operator's seat 21 intermediate the fenders 18 and 19 and positioned over the frame members 11 and 12, laterally spaced footrests 22 and 23 forwardly of the fenders and positioned at the sides of the frame members 11 and 12, and a connecting platform 24 intermediate a rear portion of the footrests 22 and 23 and positioned over the main frame members 11 and 12. A pair of brackets 25 and 26 are secured to the bottom of the mounting surface 20 at the rear end thereof and serve as a means to secure the fender deck to the rearmost resilient mounts.

The rear mounts are best illustrated in FIGS. 5 and 6, and each includes a tubular member 27 which is constructed of rubber or other suitable resilient material and is provided with an enlarged annular portion intermediate its length. The enlarged portion of the resilient tubular member 27 is bonded to a metal tube 28 which is shorter than the resilient tubular member 27 so that the member 27 extends beyond both ends of the tube 28. The upper end of the tube 28 is flanged as at 29 to provide a supporting shoulder, and the tube 28 is press fit within an opening provided in a mounting plate 30 so that the flange 29 rests on the plate 30. The mounting plate 30 is welded or otherwise suitably secured to the rear portion of one of the main frame members. Thus, it can be seen that the resilient tubular member 27 is suspended from the frame member by the mounting plate 30 and metal tube 28. Each of the brackets 25 and 26 rests directly on the upwardly extending end of one of the resilient tubular members 27 and is held in position thereon by a bolt 31 which extends through a suitable opening provided in the bracket and through the resilient tubular member 27. The bolt 31 is held securely within the resilient tubular member 27 by a washer 32 and nut 33. A ferrule 34 is positioned within the resilient tubular member 27 so that the nut 33 can be tightened without compressing the resilient tubular member 27. From the foregoing, it can be seen that the rear end portion of the fender deck 17 is entirely supported by the resilient tubular member 27 so that any vibrations present in the frame members 11 and 12 would be required to pass through the resilient tubular member 27 prior to being passed on to the fender deck.

The intermediate mounts are illustrated in FIG. 2, and take the form of a pair of resilient pads 35 and 36. The mounting pads 35 and 36 are secured to the bottom of the connecting platform 24 by a pressure sensitive adhesive and rest directly on the horizontally extending legs of the frame members 11 and 12. The mounting pads 35 and 36 are not secured to the frame members since the rear and forward mounts maintain the fender deck in position so that the pads are always overlying the horizontally extending legs of the main frame members 11 and 12. The mounting pads 35 and 36 can be made of any resilient material but are preferably constructed of a closed cell neoprene rubber.

The forward mounts are illustrated in FIGS. 3 and 4, and are secured to the forward portion of horizontal flanges on the footrests. Each of the forward mounts includes a guide 37 and a pair of bumpers 38 and 39. The guide 37 is a resilient tube which is formed of rubber or other suitable resilient material. Each of the bumpers 38 and 39 is formed of rubber or other suitable resilient material and is of annular shape. The guides 37 extend through openings provided in the horizontally extending legs of the frame members 11 and 12, the bumpers 38 are positioned over the upper end of the guides 37 and are positioned between the horizontally extending legs of the frame members and the horizontal flanges on the footrests, and the bumpers 39 are positioned over the lower end of the guides 37 beneath the horizontally extending legs of the main frame members. The guides 37 and bumpers 38 and 39 are maintained in position by bolts 40 which extend through openings 22a and 23a provided in the horizontal flanges on the footrests and through the guides 37, nuts 41 which threadedly engage the lower end of the bolts 40, and washers 42 positioned between the nuts 41 and the bumpers 39. A ferrule 43 extends through each guide 37 so that the nuts 41 can be tightened without compressing the guides 37. The guides 37 and ferrules 43 are of sufficient length so that the bumpers 38 and 39 are not normally forced against the surfaces of the horizontally extending legs of the frame members, and the openings provided in the horizontally extending legs are of sufficient size to provide a loose or sloppy fit between the guides 37 and the openings so that a small amount of relative movement between the frame members and the footrests is allowed. However, when the operator places his entire weight on one of the footrests to mount or dismount from the tractor, the bumper 38 will prevent the horizontal flange of the footrest from banging against the frame member. If, prior to assembly, the fender deck has been sprung so that the forward portion of the footrests are not properly aligned with the main frame members, the forward mounts will resiliently hold the forward portion of the footrests in proper alignment.

From the above description it can be seen that when the operator is sitting on the tractor seat 21, the major portion of his weight is carried by the rear and intermediate mounts. The weight of the operator will resist any movement of the fender deck so that vibrations in the tractor frame members 11 and 12 will be absorbed by the resilient pads 35, 36 and the resilient tubular members 27. The footrests 22, 23 or the forward portion of the fender deck do not normally carry sufficient weight to resist movement, but as indicated above, the forward mounts do not hold the footrests tightly to the frame members so that a small amount of relative movement between the footrests and the frame members can occur. Therefore, vibrations in the frame members 11 and 12 will not be passed on to the footrests 22 and 23 through the forward mounts.

It is not essential that the resilient mounts be constructed exactly as described above, but can take any form which will provide a resilient mounting. For example, the rear mounts can be constructed in any manner which will provide a resilient cushion between the brackets 25 and 26 and the plates 30.

I claim:

1. In the combination of a vehicle having a main frame mounted on forward and rear pairs of wheels; deck means mounted on said frame; said deck means including integral fenders, footrests, and a mounting surface for an operator's seat; said fenders overlying the rear pair of wheels and said footrests being located forwardly of said fenders; the improvement comprising: a first pair of laterally spaced resilient mounts positioned intermediate and interconnecting said frame and the rear end portion of said deck means; a pair of laterally spaced resilient positioning means loosely interconnecting said frame and the forward end of said deck means for limited relative movement therebetween without deforming the resilient positioning means; and a second pair of laterally spaced resilient mounts positioned between said frame and an intermediate portion of said deck means.

2. The combination as set forth in claim 1 wherein said first pair of mounts and said positioning means maintain said deck means in proper position with respect to the frame; and said second pair of mounts consist of a pair of resilient pads secured to the bottom of said deck means.

3. In the combination of a vehicle having a pair of laterally spaced longitudinally extending main frame members mounted on forward and rear pairs of laterally spaced wheels; at least a portion of each of said main frame members being of inverted L-shaped configuration; deck means mounted on said main frame members; said deck means including integral fenders, a mounting surface for an operator's seat, footrests, and platform means; said fenders being positioned over said rear pair of wheels; said mounting surface being positioned intermediate said fenders; said footrests being positioned forwardly of said fenders alongside the vertical legs of said main frame members and each including a horizontal flange overlying the horizontal legs of said main frame members; and said platform means extending across said main frame members and interconnecting the rear end portion of said footrests; the improvement comprising: vibration isolating means mounting said deck means on said frame means; said vibration isolating means including a pair of laterally spaced resilient rear mounts interconnecting the rear end portion of said deck means and the rear end portions of said main frame members, a pair of laterally spaced resilient pads sandwiched between the horizontal legs of said frame members and said platform means, and a pair of resilient positioning means loosely interconnecting the forward portions of said footrests and said frame members.

4. The combination as set forth in claim 3 wherein each of said positioning means includes a pair of resilient bumpers which loosely sandwich the horizontal leg of one of said frame members with one of said bumpers lying between said leg and the horizontal flange of the associated footrest, a resilient tubular-shaped guide extending through openings provided in said bumpers and said horizontal leg, and means securing said bumpers and guide to said horizontal flange.

5. The combination as set forth in claim 4 wherein the opening provided in said horizontal leg is larger than the outside diameter of said guide to provide limited relative movement between said guide and said frame member.

References Cited

UNITED STATES PATENTS

| 3,059,958 | 10/1962 | Lindblom | 296—35 |
| 3,420,568 | 1/1969 | Henriksson et al. | 296—35 |
| 3,438,672 | 4/1969 | Gipp | 296—35 |

FOREIGN PATENTS

| 926,834 | 5/1963 | Great Britain. |

LEO FRIAGLIA, Primary Examiner

J. A. PEKAR, Assistant Examiner